Patented Oct. 26, 1926.

1,604,886

UNITED STATES PATENT OFFICE

RICHARD LANT, OF VIENNA, AUSTRIA, ASSIGNOR, BY MESNE ASSIGNMENTS, TO D. GESTETNER, LIMITED, OF LONDON, ENGLAND, A CORPORATION.

STENCIL SHEET.

No Drawing. Original application filed November 16, 1922, Serial No. 601,415, and in Austria October 11, 1922. Divided and this application filed December 21, 1923. Serial No. 682,089.

The present application is a division of my co-pending application, Serial No. 601,415, filed November 16, 1922 for "stencil-sheet".

According to my invention the manufacturing of a protein stencil sheet, which without being hygroscopic or including water and without preliminary moistening can be used in a perfectly dry state for preparing the stencil, is realized by adding to the coating mass hydro-carbon material to such an amount, that in preparing the stencil in the typewriting machine by the impact of the type only those parts of the coating mass are removed, which are directly struck by the protruding lines of the steel type forming the characters, whilst the interstitial spaces bordered all around by the lines forming the characters will not be stamped out. The hydrocarbon material employed is of an oleaginous character and for the purposes of the invention mineral oil hydrocarbons adapted for use as lubricants and possessing a high boiling point may be used. For diminishing the brittleness of the coagulated protein to such a degree, that stencil sheets may be obtained efficiently operating without moistening, the hydrocarbon containing material has to amount to more than the weight of the protein contained in the coating mass. The hydrocarbons may be added to the solution of the protein in the form of an emulsion or of a suspension or of a colloidal solution. The coating of the open porous base, preferably paper, is effected either by dipping it into the mixed solution or else by spreading the solution on it by means of a brush or sponge.

After the coating has been dried, the sheet is drawn through a strong solution of formaldehyde for the purpose of coagulating the protein and then dried again.

What I claim is:

1. A stencil sheet comprising a base of open porous material coated with a composition, substantially free from water and hygroscopic materials, consisting essentially of a gelatinized organic colloid, deposited from an aqueous medium, and an oleaginous hydrocarbon material, said oleaginous hydrocarbon material being present in proportion sufficient to maintain the composition permanently in a state in which it may be stencilized when substantially free from moisture.

2. A stencil sheet comprising a base of open porous material coated with a composition consisting essentially of a protein and an oleaginous hydrocarbon material, said oleaginous hydrocarbon material being present in a proportion sufficient to maintain the composition permanently in a state in which it may be stencilized when substantially free from moisture.

3. A stencil sheet comprising a base of open porous material coated with a composition consisting essentially of an emulsion of a gelatinized organic coloid, deposited from an aqueous medium, and a proportion of an oleaginous hydrocarbon material sufficient to maintain the composition permanently in a state in which it may be stencilized when substantially free from moisture.

4. A stencil sheet comprising a base of open porous material coated with a composition consisting essentially of an emulsion of a gelatinized protein and an oleaginous hydrocarbon material in a proportion sufficient to maintain the composition permanently in a state in which it may be stencilized when substantially free from moisture.

5. A stencil sheet comprising a base of open porous material coated with a composition substantially free from water and hygroscopic material and containing a gelatinized organic colloid deposited from an aqueous medium and a sufficient proportion of mineral hydrocarbon-containing material of high boiling point adapted to diminish the brittleness of the gelatinized colloid and to maintain the stencil sheet indefinitely in a condition in which it may be stencilized by pressure or impact without the application of moisture.

6. A stencil sheet comprising a base of open porous material coated with a composition consisting essentially of an emulsion of a gelatinized organic colloid deposited from an aqueous medium and a viscous mineral oil present in a proportion sufficient to maintain the composition permanently in a state in which it may be stencilized when substantially free from moisture.

7. A stencil sheet comprising a base of open porous material coated with a composition consisting essentially of an emulsion including a gelatinized protein deposited from an aqueous medium and a mineral oil of lubricant character in a proportion sufficient to maintain the composition permanently in a state in which it may be stencilized when substantially free from moisture.

8. A process for the manufacture of stencil sheets adapted for stencilization by pressure comprising coating a base of open porous material with a composition consisting essentially of a gelatinizing organic colloid solated in an aqueous medium and an oleaginous hydrocarbon material of high boiling point, sufficient to maintain the composition permanently in a state in which it may be stencilized when substantially free from moisture, and rendering the coating composition substantially air dry.

9. The process for the manufacture of stencil sheets adapted for stencilization by pressure, which comprises coating a base of open porous material with a composition consisting essentially of a protein solated in an aqueous medium and a proportion of an oleaginous hydrocarbon material of high boiling point, sufficient to maintain the composition permanently in a state in which it may be stencilized when substantially free from moisture, and rendering the coating composition substantially air dry.

10. A process for the manufacture of stencil sheets adapted for stencilization by pressure in a dry state which comprises coating a base of open porous material with an aqueous disperse system including a protein and a light and viscous mineral oil in a state of colloidal dispersion, said light and viscous mineral oil being present in a proportion sufficient to maintain the composition permanently in a state in which it may be stencilized when substantially free from moisture, drying the coating and hardening the protein.

In testimony whereof I have affixed my signature.

RICHARD LANT.